United States Patent

Florschutz

[15] 3,640,488
[45] Feb. 8, 1972

[54] PEOPLE'S HELICOPTER

[72] Inventor: Franz Florschutz, 2300 Kiel, Kreienbarg 4, Germany

[22] Filed: July 15, 1969

[21] Appl. No.: 853,581

[30] Foreign Application Priority Data

Dec. 14, 1968 Germany .................P 18 14 753.0
Mar. 20, 1969 Germany .................P 19 14 227.9

[52] U.S. Cl. .................................................. 244/17.19
[51] Int. Cl. .................................................. B64c 27/82
[58] Field of Search ............ 244/17.23, 17.21, 17.19, 17.17, 244/17.15, 17.13, 17.12, 17.25, 12, 23; 416/19, 98, 100, 114, 115, 128, 129, 203; 60/39.34

[56] References Cited

UNITED STATES PATENTS

| | | | |
|---|---|---|---|
| 2,724,446 | 11/1955 | Hill | 244/17.25 X |
| 1,779,524 | 10/1930 | Zaschka | 244/17.21 |
| 1,940,108 | 12/1933 | Sweet | 244/17.15 |
| 2,425,650 | 8/1947 | Stalker | 316/19 UX |
| 2,427,936 | 9/1947 | Wales, Jr. | 416/115 |
| 2,663,372 | 12/1953 | Sikorsky | 416/19 |
| 2,704,128 | 3/1955 | Papadakos | 244/17.21 |
| 2,950,074 | 8/1960 | Apostolescu | 244/17.23 |
| 3,074,487 | 1/1963 | Derschmidt | 416/19 |
| 3,360,219 | 12/1967 | Wigal | 244/17.23 |
| 3,417,825 | 12/1968 | Ramme | 416/129 X |

FOREIGN PATENTS OR APPLICATIONS

| | | | |
|---|---|---|---|
| Ad43.796 | 5/1934 | France | 416/98 |
| 1,139,026 | 10/1962 | Germany | 244/17.19 |
| 1,269,891 | 6/1968 | Germany | 244/17.19 |

Primary Examiner—Milton Buchler
Assistant Examiner—Paul E. Sauberer

[57] ABSTRACT

The rotor consists of several groups of blades fixed to a slanting carrier in parallel position with a certain distance between them like the wing of a bird diminishing the rotor diameter, and the effect of torque and the unsymmetry, giving greater stability, and enabling higher peripheral speed whereby the flow at the backward-turning blade does not cease. The carrier of each blade group is connected by flapping hinges to the outside ring of the hub relatively large in relation to blade length. By turning the blade group the angle of incidence of blades is changed. The blade groups are periodically and collectively controlled by y control device based on a hydraulic system which is installed along the rotor shaft. A control wheel allows radial turning of the whole control device making it possible to control the helicopter in longitudinal and lateral sense. Compensation of torque and of the unsymmetry of rotor during forward flight is brought about by a long and large-surface rotor airfoil with counterweight which is installed variably and with opposite direction of rotation on top of main rotor through a differential gear in the rotor head. This airfoil is stopped during forward flight by the flow of drive wind, so that the helicopter shows an unsymmetric airfoil giving a lift by which the unsymmetry of the stream of rotor is eliminated. Compensation of torque and of the unsymmetry of rotor works automatically without special control. The blade group rotor, blade control and torque compensation are a compact unit propelled by an engine which is installed in the fuselage before the pilot.

17 Claims, 13 Drawing Figures

PATENTED FEB 8 1972 3,640,488

INVENTOR.
Franz Florkchitz

BY

ATTORNEYS

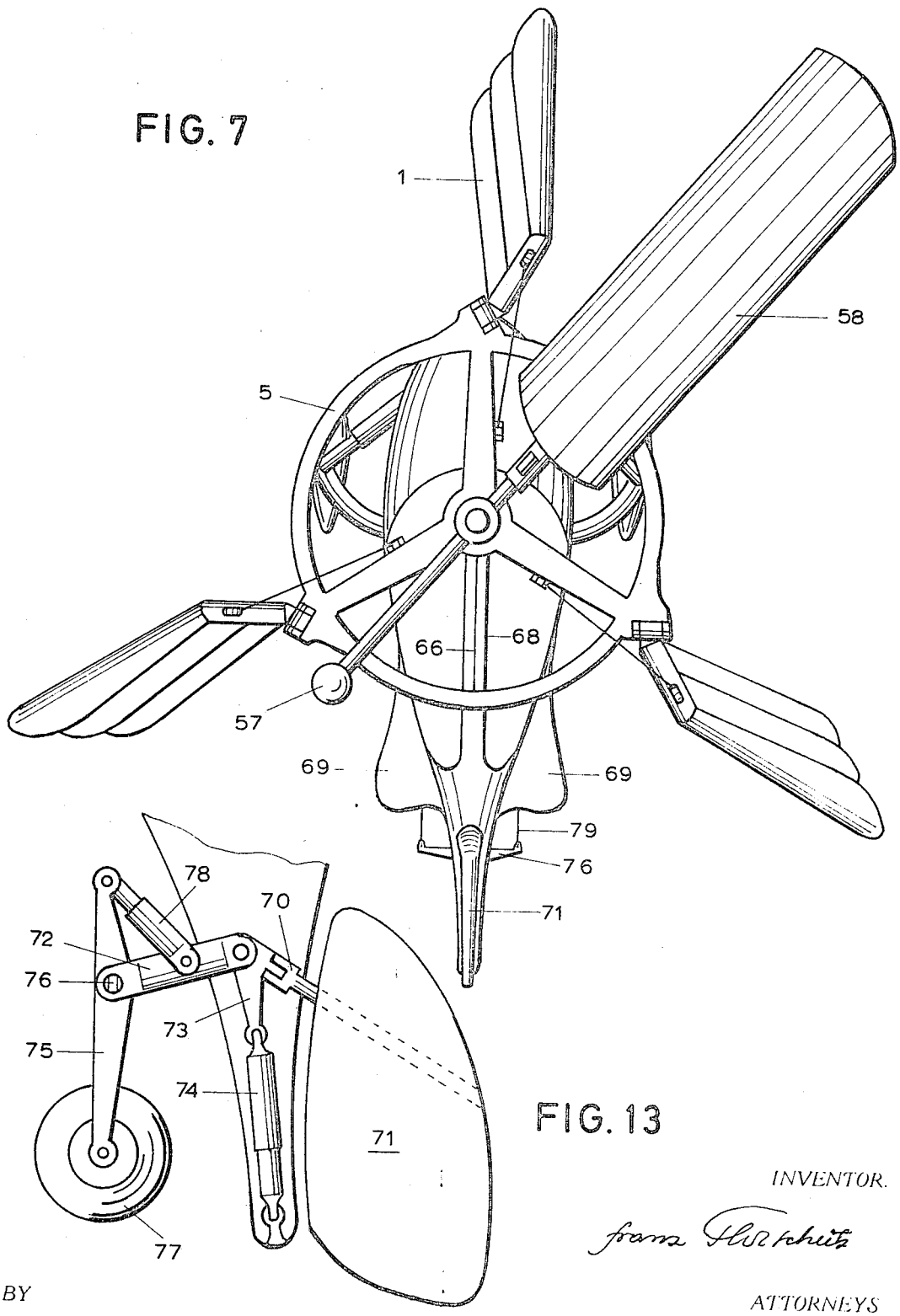

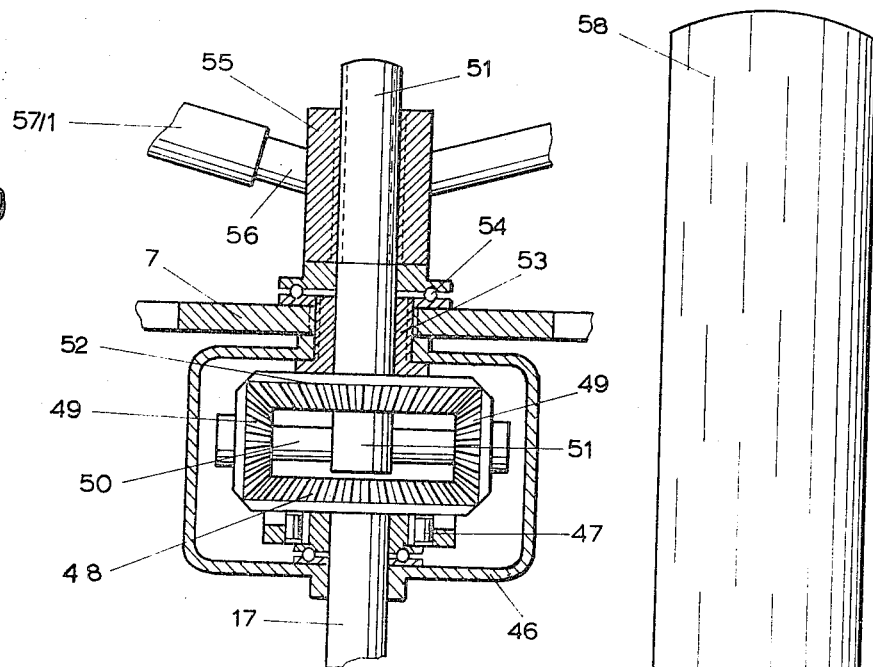
FIG. 9
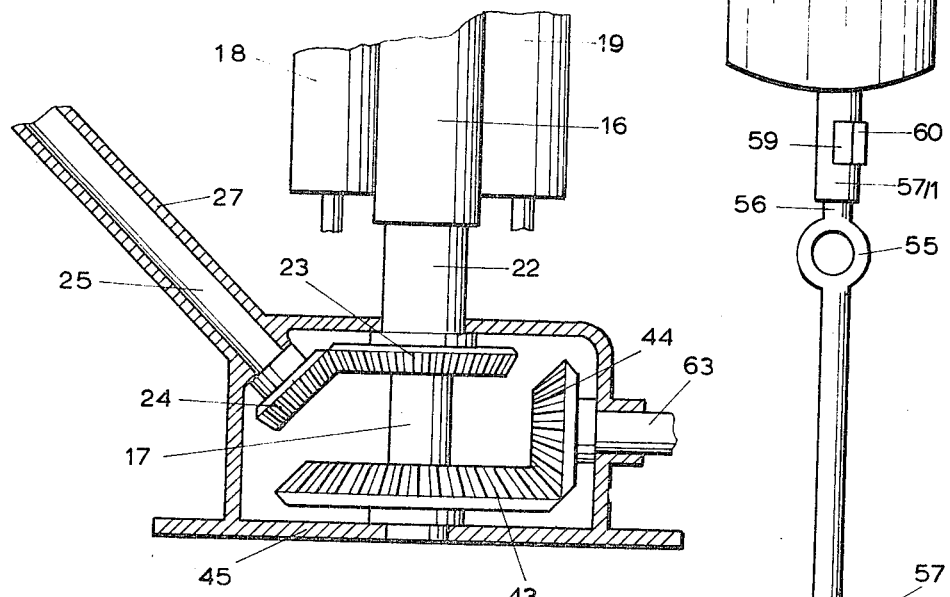
FIG. 10
FIG. 11

PEOPLE'S HELICOPTER

DETAILED DESCRIPTION

The invention covers a single-rotor helicopter with shaft-drive, the helicopter being mainly for passenger air traffic, with one to five seats.

Normally helicopters are built with very long rotor blades, tail rotor for torque compensation, complicated controls and aerodynamically unfavorable fuselages.

Such helicopters pose the problem of separation of flow. The bending and flapping of rotor blades is a permanent source of danger of a possible blade break. Moreover, the control of such helicopters is very problematic, the dimensions are too large, the construction of the fuselage with tail rotor unfavorable, the harmful drag too great, and maneuverability as well as safety too low, thus making general air traffic impossible.

The objective of the invention is to reduce the rotor diameter while maintaining a sufficient lift and in this way to improve stability, flow conditions and strength, and to diminish the torque and the unsymmetry of the motor. Moreover, the helicopter parts are not in the airflow of the rotors, and the blades shall be lighter weightwise, and production substantially cheaper. In addition, the blade group guard ring is also to guarantee the stability and safety, in particular during autorotation, through the release of kinetic energy. Torque compensation through the differential rotor replaces the tail rotor, the objective being simplified control, absolute safety during takeoff, autorotation and landing, compensation of asymmetry of the rotor during forward flight by blade lift, and an ideal design of the fuselage. Moreover, during landing there is no danger that rotor blades get into contact with ground. The rotor thrust goes through the neutral point which increases the stability of the helicopter and excludes rolling motion. The hydraulic blade control simplifies the steering of the helicopter, which by means of a steering wheel is very handy and stable, bringing about an unusual efficiency, maneuverability, and flying safety.

The helicopter can be turned to the right or left around its yaw axis during hovering flight through the rotor-produced airflow guided over the rudder control.

The practical arrangement of the rotor shaft in front of the cabin and of the driving engine in the front end of the fuselage make an ideal helicopter weight distribution possible. In addition, this permits to achieve an optimum aerodynamic form of the fuselage.

The side fins, as horizontal tail unit, are to achieve a stable position of the helicopter during forward flight. The three-wheel landing gear with tailwheel control permits a fast movement of the helicopter on the ground by rotor thrust. Moreover, the spring assembly can take also higher loads in cases of hard landings without deformation of material. On the whole, no special airports are needed for such helicopters making it possible that general traffic can develop unhindered.

The advantages which can be achieved by the invention are that a closed unit is formed through the superposed arrangement of blades in blade groups, which, with fixed angle of incidence and constant rotor revolutions, can be rotated about the flapping hinge to vary the lift. Such blade group unit permits the construction of stable and light blades, without distortion, so that there is separation of airflow. Moreover, this makes the rotor diameter smaller which is of great importance for general air traffic. The large flapping hinge distance favors the stability behavior, the outside ring releasing latent energy especially during autorotation flight. Such rotors permit also a higher peripheral speed and thus even a still higher rotational speed which is especially for airflow. Sometimes a reduction gear is no longer required. Blade control with a circular-closed hydraulic system is stable and handy, there are no stick forces and piloting is essentially simplified and thus made easier. Torque compensation by a differential rotor with counterbalance on top of the main rotor is unusually advantageous; torque is automatically adjusted during hovering flight. During forward flight the rotating airfoil restrained on the retreating side through incident flow, and with a steep angle of attack this produces a lift which corrects the asymmetry of the rotor. During autorotation flight the large-surface blade intensely brakes the helicopter during downward flight, thus preventing the stopping of rotation and guaranteeing a landing without accident.

The practical arrangement of the rotor shaft in front of the cabin and the removal of the tail rotor makes it possible to have an optimum aerodynamical form of the helicopter fuselage and to reduce its dimensions.

Drive by a reciprocating engine, installed horizontally in the front end of the fuselage, is economic in fuel consumption and gives the helicopter a maximum flying range and flying time. In accordance with the invention this problem is solved in that the rotor has at each flapping hinge a group of blades mounted on a carrier, the carrier cutting the blades in a slanting direction.

The rotor blades have the same length, and with rotor blades lying in or parallel to the hub plane the carrier forms an acute angle with the lower part of the shaft.

The pilot can turn at random the blade groups about the flapping hinges via the blade controls. The flapping hinge axle of the blade group is arranged inclined on the guard ring and turned inwards in direction of rotation. In this way the lift can be varied, the blade angle of incidence increasing with upward rotation of blade group, and decreasing with downward rotation. Moreover, an increase of the coning angle increases the stability of the helicopter. Thus the direction of relative wind for zero lift is produced by the bottom section of the blade group. With a parallel position of the rotor blades to the hub plane the blade group carrier is preferably inclined with the upper section in direction of rotation.

Preferably the angle of incidence of the blades and the carrier is fixed, and the blade depth smaller at the blade root than at blade tip.

It is advantageous if the hub is designed as a spoke wheel, the flapping hinge of each blade group being held at an outer ring of the hub. The blade group carrier is controlled by a cable line at the upper section, the cable line being flexibly connected to the rotating part of the swashplate by means of a shift lever and push rod. The periodic change in blade angle is achieved by means of a swashplate. An axially and radially movable control carrier is arranged in the form of a tubular jacket along the rotor shaft. The control carrier holds on the upper section with the two-part and rotary axle the fixed part of the swashplate. The hydraulic system with always one driving piston for periodic and collective blade pitch control is mounted on the lower section of the control carrier. The fixed control sleeve is on the lower end between rotor shaft and control carrier. A guide pilot and supporting pivot are fixed lateral to the control sleeve, and the horizontal bevel gear is mounted on the lower part. By means of the vertical bevel gear the control carrier can be turned at random with the steering wheel.

The hydraulic blade control, as closed and positively actuated gear, is connected through reaction pressure with a double coupling between drive and power takeoff. The hydraulic system consists of the working and reserve oil cylinder, plunger, valve lifter, and adjusting of the driving piston with the upper junction of the power takeoff piston. The plunger of the power takeoff piston for the periodic blade control is flexibly linked with the control rod, while the plunger for the collective blade control is connected to the pivot and the control sleeve. The driving hydraulics are located on the right and left side of the pilot and are operated by turning via lever with hand knob.

The driving engine is installed horizontally in the nose of the fuselage, drive of the motor shaft being effected through the coupling and miter-wheel gearing.

The driving and steering wheel gears are located in a housing which is mounted on the fuselage floor of the helicopter.

The differential gear for torque compensation and rotor drive is installed in a housing between rotor hub and swashplate. The horizontal bevel gear is mounted through the freewheel on the upper end of the driving shaft, the horizontal bevel gear meshing with the vertical bevel gear pair. The bevel gear through transverse axle is rigidly mounted on the divided rotating airfoil shaft. The rotating airfoil shaft goes through the upper, horizontal bevel gear which by means of a pipe flange is mounted with the lower part of the thrust bearing on the hub of the rotor. The rotating airfoil with the counterbalance is attached to the shaft and the upper part of the thrust bearing by means of the pipe flange.

The rotating airfoil is swivelably arranged on the inclined shaft through the tubular shaft and has a guide slot in which glides the pivot rigidly mounted on the shaft. The tubular shaft is mounted at the place of the rotating airfoil, automatically producing a steep angle of attack through incident flow during torque compensation. During autorotation the airfoil will rotate in the same direction as the rotor and automatically form a low angle of incidence through the incident flow, the pivot securing the stop.

The helicopter fuselage consists of fuselage nose, cabin, and fuselage tail. The horizontally installed driving engine, fuel tank and vertically arranged rotor shaft are in the nose of the fuselage. The steering wheel with control sticks, as well as accelerator pedal and rudder pedal are in the cabin. One to five seats can be installed depending on the size of the helicopter. The doors are hinge-mounted on the cabin middle strut and open from bottom towards top. At top the rotor shaft is movably attached to the middle strut of the cabin through the control carrier in the support with the supporting arm. The rudder is mounted on the inclined control rod at top of fuselage tail. The control rod of rudder has a Cardan connection with the tailwheel control and is mounted on the fuselage tail through a shank together with the storage spring for zero position. The two-arm lever is linked to the tailwheel control, the wheel being on the one end of the lever and on the other end the draw spring being coupled with the control rod. On each side of the transverse axle a pull cable is coupled with the rudder. The front wheel-type landing gear consists of two which are flexibly mounted on the fuselage floor by inclined supports. At lower end of wheel carrier the pressure spring is mounted, slanted, and flexible, in telescopic manner on the fuselage floor. Small fins, forming the elevator, are mounted on each side in the second half of the helicopter. As shown in the side view, the fuselage nose runs in a round shape and downwards in a straight line up to two-thirds of the overall length, then tapers off with a slight roundness and then runs out straight-lined in the tail end. On the top side the fuselage nose slopes upwards to the windshield. The windshield is slightly convex; then follows the curved roof up to the cabin crown which in a slight curvature tapers off and runs out straight-lined in the tail end. As seen in the top view, the helicopter has drop shape, the fuselage thickness being greatest in the first third of the fuselage length.

The design of the invention is shown in the drawings and specified in the following.

Figure 1:
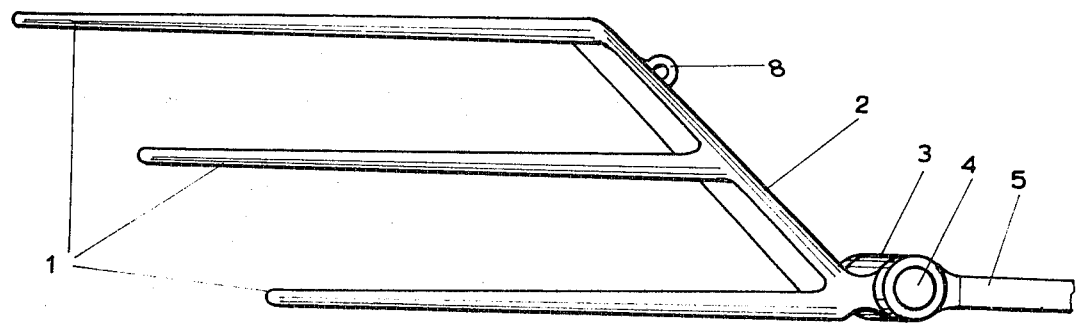
FIG. 1 is a front view showing the blade group unit with flapping hinge connection at guard ring.
Figure 3:
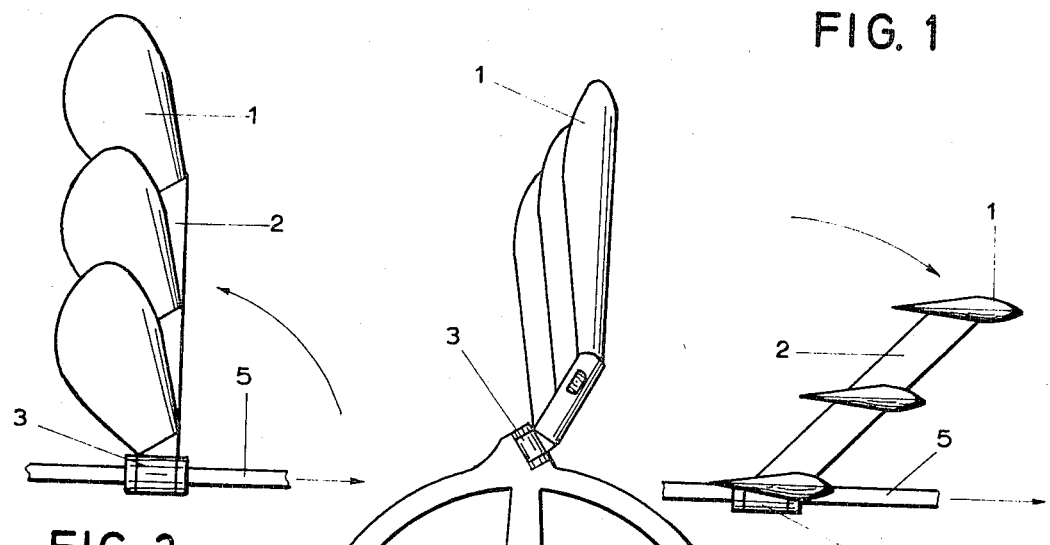

FIG. 3 showing the blade group in a turned-up position.

Figure 4:
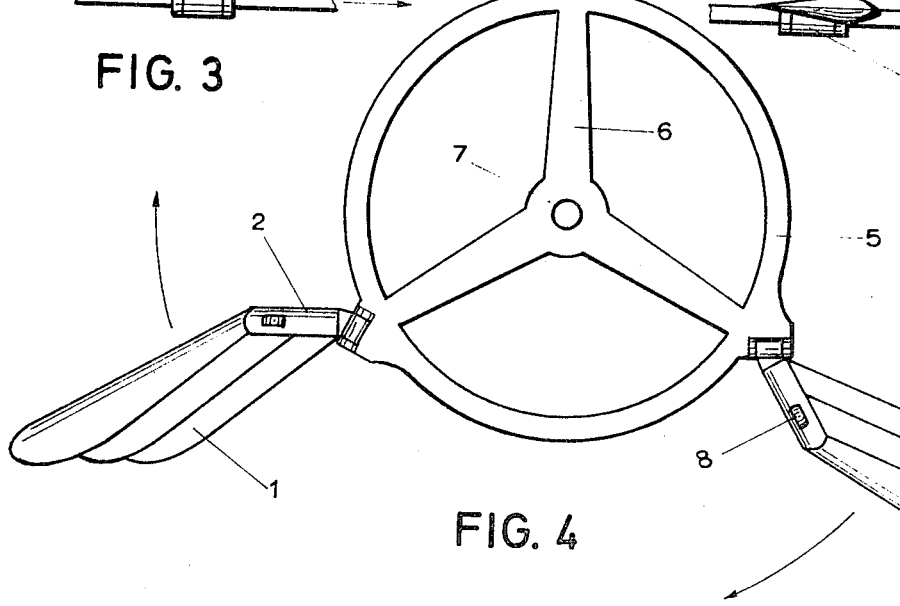

FIG. 4 is a top view showing the helicopter rotor.

Figure 5:
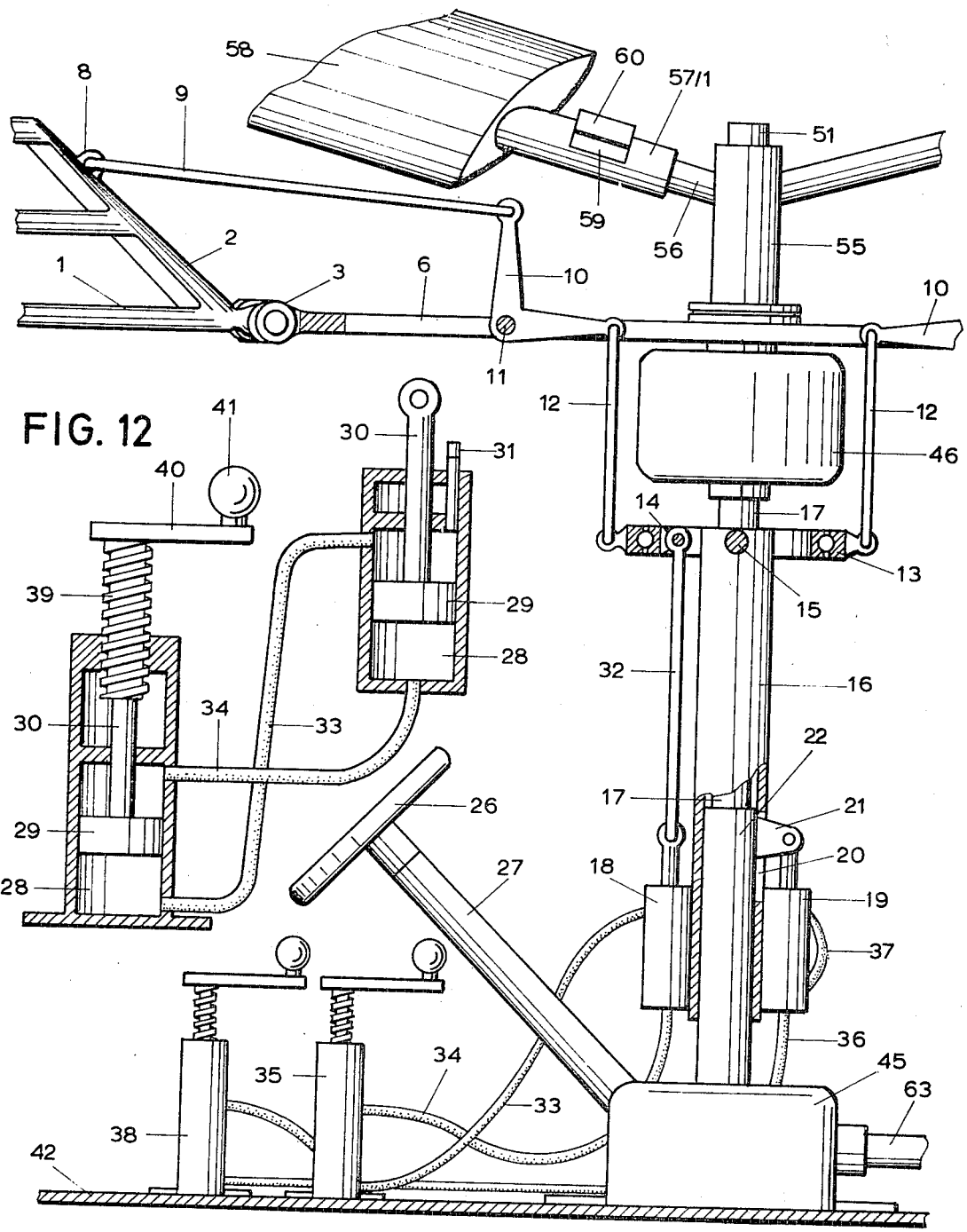

FIG. 5 is a sectional view showing the hydraulic blade control and torque compensation.

Figure 6:
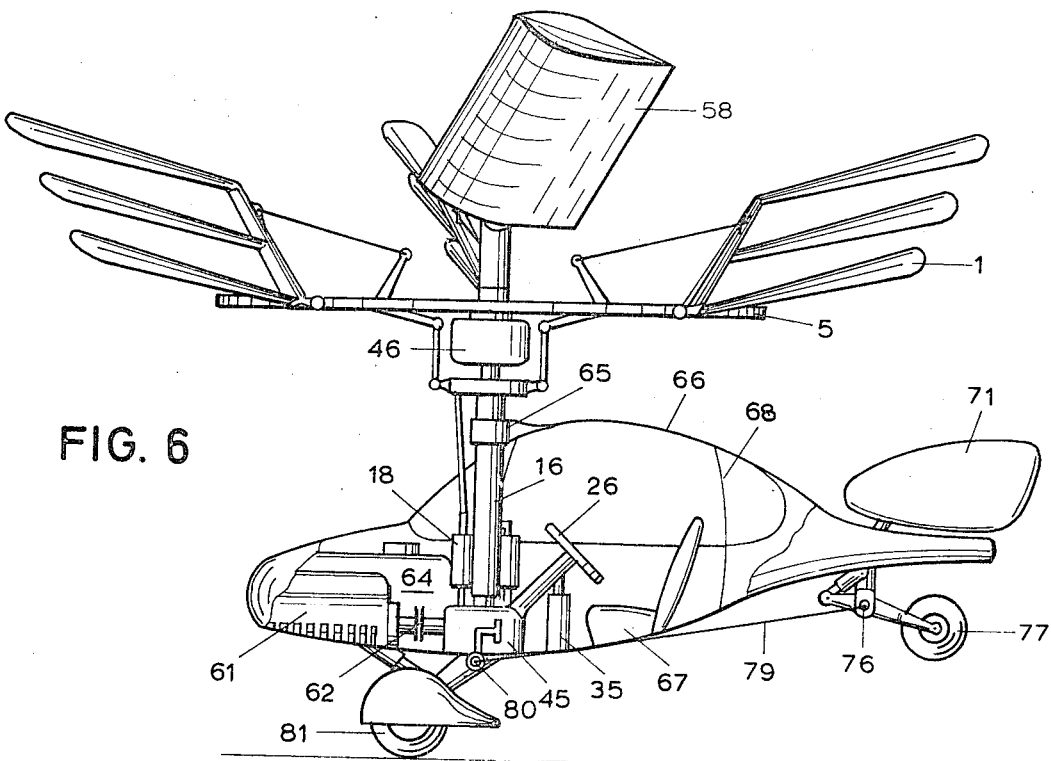
Figure 8:
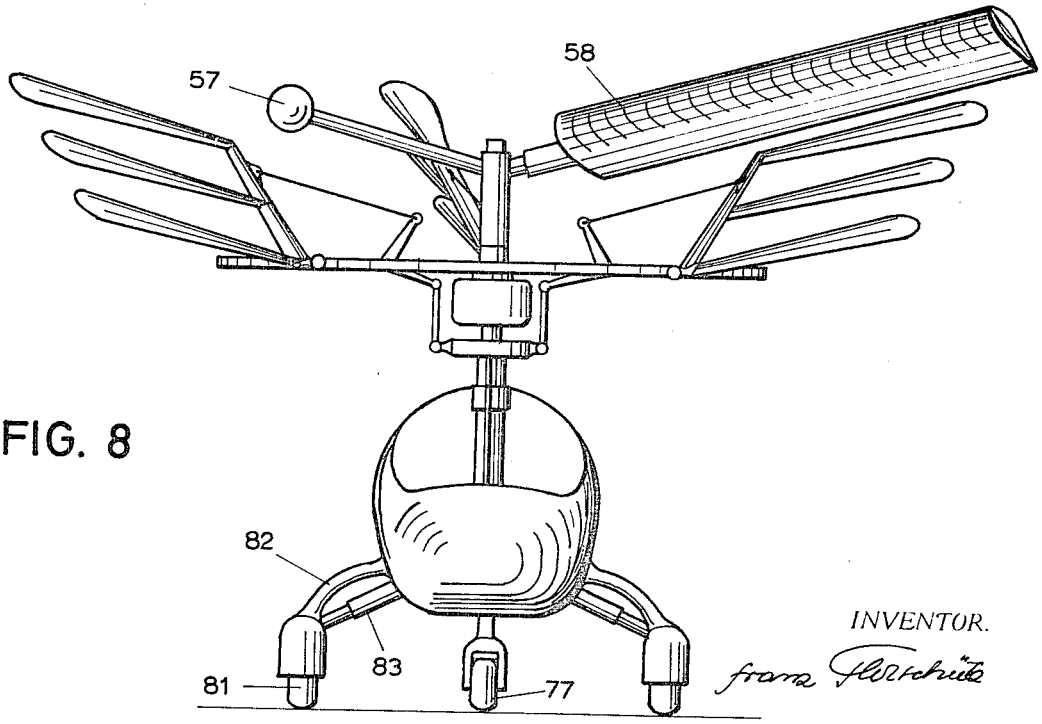

FIG. 6 is a sectional side view of the people's helicopter,

FIG. 7 a top view,

FIG. 8 is a helicopter front view,

FIG. 9 is a differential gear,

FIG. 10 is a driving gear and control gear,

FIG. 11 is an airfoil with counterweight,

FIG. 12 is a hydraulic system, and

FIG. 13 is a rudder control and tail rotor control.

Figure 2:
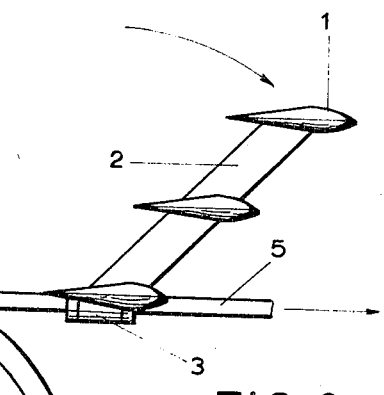
FIG. 2 is a side view showing the blade group.

FIGS. 1, 2, 3, and 4 show a blade-group unit in which blades 1 are attached with a fixed angle of incidence to carrier 2. Carrier 2, by means of flapping hinge 3, is movably attached by bolt 4 to guard ring 5. Guard ring 5 is firmly connected with rotor shaft hub 7 by spokes 6. FIG. 4 shows the inclined position of flapping hinge 3, in addition, the form of blades 1 and the inclined angle of incidence of carrier 2. FIG. 2 shows the inclined position of carrier 2 with a parallel position of blades 1 to hub plane. Positional change of carrier about by turning of the blade group about the inclined flapping hinge axis. With upwards turning of the blade group carrier 2, as shown in FIG. 3, will take a vertical position. At top carrier 2 has a mounting 8 to which pull cable 9 is attached, its other end being coupled with shift lever 10. Shift lever 10 is swivelably mounted by bolt 11 on spoke 6. Shift lever 10, in FIG. 5, by bolt 11 on spoke 6. Shift lever 10, in FIG. 5, by means of push rod 12 is swivelably connected with the rotating part of the swashplate 13. The fixed part of the swashplate 14 is swivelably arranged on the two-part axle 15 which is attached to control carrier 16. Control carrier 16, in the form of a tubular jacket, is axially and radially movable on rotor shaft 17. The power takeoff hydraulics of the periodic blade control 18 and the power takeoff hydraulics of the collective blade control 19 are mounted at the lower end of the control carrier. Moreover, at the lower end of the control carrier 16 is a guide slot 20 in which pivot 21. Pivot 21 is attached to the upper part of the control sleeve 22, while according to FIG. 10 the horizontal bevel gear 23 is attached to the lower part of the control sleeve. The vertical bevel gear 24, attached to the steering column 25, meshes with the horizontal bevel gear 23. Steering column 25 is firmly connected with steering wheel 26 and is installed in mount 27.

As shown in FIG. 12 each hydraulic element consists of working and reverse oil cylinder 28, plunger 29, valve lifter 30 and adjusting valve 31. The plunger of power takeoff hydraulic system 18 for periodic blade control is pin-jointed with the fixed part of swashplate 14 by means of control rod 32, whereas the plunger of the power takeoff hydraulic system for collective blade control 19 is connected with pivot 21 and thus firmly attached to control sleeve 22. The power takeoff hydraulic system 19 is connected to the driving hydraulic system 38 by means of flexible pipes 33 and 34. The power takeoff hydraulics system 19 is coupled with the driving hydraulic system 38 by means of pipes 36 and 37. The plungers 30 of the driving hydraulics 35 and 38 are operated by means of screws 39 on which lever arm 40 with hand knob 41 is mounted. Driving hydraulics 35 and 38 are mounted on the fuselage floor 42. The horizontal bevel gear 43 is mounted on the lower end of rotor shaft 17, the horizontal bevel gear 43 being driven by the vertical bevel gear 44. The driving gear and steering wheel gear are installed in housing 45 and mounted on fuselage floor 42.

According to FIG. 9 the differential gear for torque compensation and rotor drive is installed in housing 46 between rotor hub 7 and swashplate 14. Free wheel 47, holding the horizontal bevel gear 48, is attached to upper end of rotor shaft 17. The vertical bevel gear pair 49 meshes with the horizontal bevel gear 48, the vertical bevel gear pair 49 being pivoted on transverse axle 50 and thus attached to the divided rotor airfoil shaft 51. Rotor airfoil shaft 51 passes through the upper horizontal bevel gear 52 which is attached to the pipe flange 53. Pipe flange 53 is firmly connected with rotor hub 7 through the lower part of thrust bearing 54. The upper part of thrust bearing 54 is attached to rotor airfoil shaft 51, and as shown in FIG. 11 above this the inclined rotor airfoil axle 56 and the axle with the counterweight 57 are attached to rotor airfoil shaft 51 by means of pipe flange 55. The hollow axle 57/1, to which the large-surface rotor airfoil 58 is attached, is swivelably mounted on the rotor airfoil axle 56. The hollow axle has a guide slot 59 in which moves the pivot 60 which is firmly attached to the rotor airfoil axle 56.

The driving engine 61, FIG. 6, is installed horizontally in the fuselage nose, drive being effected by coupling 62 and drive shaft 63. Fuel tank 64 and gear housing 45 with control carrier 16 is also installed in the fuselage nose. Rotor shaft 17 is movably held at top by means of control carrier 16 in supporting arm 65 which is attached to middle strut 66. Steering wheel 26, driving hydraulics 35 and 38, as well as pilot seat 67 are installed in the cabin. Cabin doors 68 hinged on both sides to middle strut 66 and are opened from bottom to top. Fins 69, FIG. 7, are mounted horizontally as elevator control at tail part of fuselage. As shown in FIG. 13 rudder 71 is attached to inclined control rod 70 at fuselage tail. Control rod 70 is Cardan-coupled with tailwheel control 72, shank 73 with storage spring 74 being attached to fuselage tail for zero position. The two-arm lever 75 is movably mounted on transverse axle 76 at tailwheel control 72; tailwheel 77 is mounted on the one end of the lever arm, while draw spring 78 is connected to the other end of the lever arm which on the other hand is coupled with the wheel control 72. A pull cable 79, which is coupled with the transverse axle of the rudder pedal 80, is attached on each side of transverse axle 76.

Front wheel 81, FIG. 6 is attached to inclined 82 which is hinged to fuselage floor. The telescope-type pressure spring 83, which in inclined position is hinged with its other end to fuselage florr, is hinge-mounted on the lower part of the wheel carrier 82. In FIG. 8 the helicopter is shown in front view demonstrating its characteristic features, the blade group motor with differential airfoil for torque compensation, the aerodynamic shape of the fuselage, the landing gear and the stable and compact unity are a whole.

The mode of operation of the invention is specified in the following:

The practical construction of the helicopter rotor, the blades 1 being superposed, guarantees an effective lift through the superposed rotor disks.

On account of the centrifugal force the blade groups tend to turn downwards about the flapping hinge 3 which decreases the blade angle of incidence and thus produces a zero lift position.

When turning down the collective blade control 38, the driving piston presses the pressure medium through pipe 37 into the upper part of the power takeoff cylinder 19, the plunger relying on pivot 21 and control carrier 16, through the centrifugal force on the blade groups, moves upwards in guide slot 20 by means of swashplate 14, push rod 12, shift lever 10 and pull cable 9. When turning the collective blade control upwards, the control carrier moves downwards which turns the blade groups upwards about the flapping hinge.

Through the turning down of the periodic blade control 35 the driving piston presses the pressure medium through pipe 33 into the upper part of the power takeoff cylinder 18, the piston moving the control rod 32 downwards and thus inclining the swashplate at fixed part 13 about axle 15 and thus bringing about a periodic group control by means of push rod 12, shift lever 10, and pull cable 9.

Control sleeve 22 is turned to the right or left via bevel gears 23 and 24 by steering wheel 26 and so is control carrier 16 by means of pivot 21 which gives pitch and yaw control of helicopter. The differential gear is installed in housing 46 between rotor hub and swashplate, the differential gear driving the rotor and by means of rotating airfoil 58 with counterweight 57 bringing about torque compensation. The horizontal bevel gear 48 moves the vertical bevel gear pair 49. At top the bevel gear meshes with the horizontal bevel gear and relies on it. The very moment that the aerodynamic drag at the rotor increases, the bevel gear pair rotates the rotor airfoil shaft 51 in counterdirection, rotating airfoil 58 having as countersupport a corresponding aerodynamic drag which produces torque compensation.

To start the helicopter the pilot has to start the engine which with increased number of revolutions automatically drives the rotor shaft via a centrifugal clutch through the miter gear. The blade angle of incidence is zero, torque also being low. The rotor rotates faster and faster, the outer ring, on account of its own weight, storing kinetic energy like a flywheel. As soon as the necessary rotor speed is reached, the pilot operates the collective blade adjusting lever so that the rotor thrust suffices to lift the helicopter. Now the differential rotor airfoil, with steep angle of attack, will slowly rotate in counterdirection of rotor to compensate the torque. During hovering flight he can operate the rudder pedal, and by means of the steering wheel adjust the resultant to the center of gravity. In case there would be an unforseen motor breakdown in this state, the rotor, through the release of the stored kinetic energy, will guarantee a landing without accident. With building up of speed, the rotor resultant will be inclined forward through pilot's operation of the periodic blade-adjusting lever. On account of asymmetrical incident flow during forward flight, the pilot must continuously correct the lead of the resultant by means of the steering wheel. At a certain speed during forward flight the differential rotor airfoil is braked by incident flow and produces on the side of the retreating rotor blade a lift which compensates the asymmetry of incident flow.

By the construction of the blade group rotor it is possible to diminish diameter of rotor, torque as well as the unsymmetry of flow thus being smaller than those of the existing helicopters rotor. Besides, flow does not break off at the blade group rotating backward. Thus the variable asymmetric airfoil meets the requirements for a perfect working at torque compensation.

The unsymmetry of flow of rotor is compensated by the rotating or stopped airfoil 58, depth, length, and angle of airfoil 58 being harmonized accordingly. The drive speed of helicopter at which airfoil 58 is stopped, flows from the flow speed (drive speed) of the tangential air forces (air lift and resistance) resulting at blade 58 and the quantity of torque at the rotor. At a speed when the tangential air forces resulting at airfoil 58 are larger than the torque at the rotor, blade 58 is stopped and placed in backward position. As long as this drive speed is not reached, blade 58 will rotate. This forward speed at which blade 58 will still rotate, is comparatively small, the unsymmetry of rotor being smaller, too. At such speed airfoil 58 will, while rotating, sporadically have varied rotating speeds caused by its momentous position towards direction of flight, airfoil 58 turning faster when rotating backward for the added flow speed (shorter time of effect), while rotating slower for the same amount of speed (longer time of effect) when rotating forward. The result is that airfoil 58 has another unsymmetry through flow, the lift being diminished at back drive of airfoil 58 and enlarged during forward of rotor thus being compensated. As the torque of rotor is constant, rotating speed of airfoil 58 during flight will be the same as the rotating speed at hovering flight, airfoil 58 rotating at a varied rotating speed during flight. This varied rotating speed of blade 58 is made possible by the differential gear. It is a prerequisite for an effective working of the airfoil. The same effect appears at the blade group rotor during larger flight speed enabling blade group to rotate at a varied speed with the effect of an advantageous revertive control. By the varied rotating of blade 58 in the lower scope of flight speed the unsymmetry of the rotor is compensated and stability of helicopter is maintained, control by "feel" through wheel 26 being unnecessary. Through the rotating of blade 58 changing air forces are produced. But at low flight speeds they cannot influence the stability of helicopter. Because of the large distance of flapping hinges of the blade group and its solidity the blade group rotor guarantees extreme stability in each position.

By virtue of the arrangement of the differential gears drive bevel wheel 48 will put airfoil 58 in the same rotating direction. With increasing rotating speed airfoil 58 will be braked by the flow of tangential air forces and the blade group rotor backing level wheel 52 and bevel wheels 49 will be forced to rotate in opposite direction. In the stopped position the torque acts on blade 58 tending to turn the airfoil in a direction opposite the flow. Airfoil 58 is constantly exposed to the power of torque, on no account being able to rotate in the same direction as the rotor. Only in case of breakdown of drive engine, when no torque exists, the blade will be put in the aft position or will autorotate in sinking flight.

In the stopped position airfoil 58 will be put in the aft position of the least resistance by the flow of tangential air forces, and in this position it will stay as long as the flight speed is not diminished so much that the tangential flow of the air forces is smaller than the torque.

In the stopped position of airfoil 58 the torque compensation is effected by the flow of the tangential air forces, i.e., by the flight speed, while the necessary flow of the tangential air forces at hovering flight is reached by the rotating speed of the airfoil.

During autorotation flight the differential rotor airfoil will rotate in the same direction as the rotor (as there is no torque), the blade angle of incidence decreasing automatically.

The helicopter lands first with the front landing gear and then settles on the flexible tail wheel. Operation of the rudder pedal permits to steer the helicopter on the ground by means of the tailwheel.

I claim:

1. A people's helicopter with a blade group rotor, a variable unsymmetric rotor airfoil for the compensation of torque and unsymmetry and a blade control characterized in that the rotor blades are shaped as short blade groups connected by flapping hinges with an outside ring of a hub, so that the rotor diameter and, consequently, the torque and the unsymmetry are diminished, while stability and solidity of rotor are increased, the short blade groups effecting the rotor thrust by means of circular planes lying peripherically one upon the other, thus preventing the cessation of the central flow and of the flow at the retrograde blade so that at higher flight speeds torque, unsymmetry, and lift of rotors remain constant, the rotor being linked up with the drive shaft by means of differential gear and variably and in opposite rotation connected with the rotor airfoil.

2. A people's helicopter as under claim 1 above defined in that a group of blades is mounted on a carrier, the blades being arranged parallelly above each other in certain intervals and the carrier cutting the blades at an inclined angle, the consequence being that each subordinate blade is staggered towards the inside enabling an advantageous throughflow.

3. A people's helicopter as under claim 1 above defined in that the rotor blades have the same length and the angle of incidence of blades and carrier is fixed while blade depth lessens at the blade root.

4. A people'helicopter as under claim 1 above defined in that a towing line of the blade control is fixed at the upper part of the carrier and at the lower part of it the flapping hinge is fixed whereby the blade group is held swiveable by the inclined flapping hinge axle at the external ring of the hub which is designed as a spoke wheel, the blade group being above the hub when blades are in a position parallel to the hub plane.

5. A people's helicopter as under claim 1 above, in which the angle of incidence of blades is enlarged by the inclined position of the flapping hinge axle when blade group is turned upwards and the upper part of the blade group is inclined backwards, while blade group is turned downwards by the effect of centrifugal force, whereby the angle of incidence of blades is reduced, the upper part of blade group thus being inclined forward in the direction of rotation.

6. A people's helicopter as under claim 1 above in which a differential gear casing is arranged below the rotor hub, whereby the rotor is variably connected with the airfoil and the drive shaft, a lower horizontal bevel gear being connected with the drive shaft by means of a free wheel, and an upper horizontal bevel gear being fixed to the rotor hub by means of a pipe flange, an airfoil shaft going through the pipe flange and the upper bevel gear and at the lower end being fixed to a lateral axle, a vertical bevel gear being arranged at each end of the lateral axle, thus forming the gear by meshing with the two horizontal bevel gears.

7. A people's helicopter with a blade group rotor, a variable unsymmetric rotor airfoil for the compensation of torque and unsymmetry and a blade control characterized in that above the rotor a long-stretched asymmetric rotor airfoil is connected uncontrolled, variably and in opposite rotation stretching beyond the blade group with mass compensation, by means of a differential gear, the airfoil having great depth and a steep angle, whereby resistance is so strong that the rotor airfoil compensates the torque of the rotor by a slow rotation in hovering flight and, at the same time, effects a lift, while at a higher flight speed as compared with the proper peripheral speed the rotor airfoil is stopped by the flow of the tangential air forces at the side of the rotor blade rotating in retrograde direction thus forming an asymmetric airfoil in the inverted position, compensating torque and asymmetry of rotor.

8. A people's helicopter as under claim 7 above defined in that the airfoil is firmly connected with a hollow axle which is mounted adjustable at a sloping upward airfoil axle by means of supporting pivots enabling the angle of incidence of the airfoil to be automatically reduced during autorotation flight, while for mass compensation of the airfoil the counterweight is fixed to the opposite arm of the airfoil axle, the whole unit being fixed to the airfoil shaft by a pipe flange of the airfoil axle which is in the center of gravity, a pressure bearing being arranged at the rotor hub.

9. A people's helicopter as under claim 7 above defined in that length, depth, and angle of incidence of airfoil must be harmonized, the lift of the rotor airfoil in stopped position being equal to the unsymmetry of the rotor.

10. A people's helicopter as under claim 7 above defined in that at smaller flight speeds in comparison with the peripheral speed of the rotor airfoil the unsymmetry of rotor is compensated without control by the unsymmetry of the rotor airfoil at varied rotation speed.

11. A people's helicopter as under claim 7 above defined in that the peripheral speed of the rotor airfoil is determined by the quantity of the resistance of the air forces tangentially resulting along the rotor airfoil and by the quantity of the counteracting force of rotor torque, the resulting resistance of the air forces being dependent upon the length, depth, and angle of incidence of the rotor airfoil, while the peripheral speed of the airfoil must not be held smaller than the least peripheral speed of the airfoil, the helicopter being still able to maintain stability by the effect of the varying air forces.

12. A people's helicopter with a blade group rotor, a variable unsymmetric rotor airfoil for the compensation of torque and unsymmetry and a blade control characterized in that the control carrier with attached control devices is mounted at its lower section along a control sleeve, it being possible to adjust axially the control carrier on the rotor shaft by hydraulic devices, a control wheel for radially swivel the control sleeve and thus the whole control device by means of gearing, allowing herewith longitudinal and lateral controls, and cyclic and periodical control of the blade groups being hydraulically performed by means of hand screws.

13. A people's helicopter as under claim 12 above defined in that the control carrier is arranged along the rotor shaft between a differential gear and a drive casing in the shape of a case pipe, a fixed part of a swashplate being swivelably held by a two-part axle at the upper end of the control carrier, while at the lower end of the control carrier two power takeoff hydraulics are installed, the control sleeve being arranged in between with the control carrier on the rotor shaft over slot through pivot, whereby at the lower end of the control sleeve in the gear casing a horizontal bevel gear is fixed gearing into a bevel gear of a control rod, it being possible to turn the control sleeve and, consequently, the whole control device with the control wheel around the rotor shaft to the right or left.

14. A peopl's helicopter as under claim 12 above defined in that each hydraulic device works as a closed and guided gear with double coupling between drive and power takeoff, two cylinders being crosswise connected with a plunger for each of them by means of two elastic cables, operation effected by hand being transmitted to power takeoff hydraulic via hand knob, lever, and screws at the driving hydraulic system, starting blade control thereby, while loss through leakage of the pressing devices is compensated by reverse oil cylinders, the refilling being effected through an adjusting valve.

15. A people's helicopter as under claim 12 above defined in that one power takeoff hydraulic system is pivot-jointedly connected with the control rod and the stationary part of the swashplate by means of the plunger, the swashplate being tilted round the axle by operating the driving hydraulic system, whereby the rotating part of the swashplate which is pivot-jointedly connected with the blade group by push rod, shift lever and pull cable cyclically controls the rotor, the plunger of the second hydraulic system being attached to the supporting and guiding pivot of the control sleeve whereby on operating the drive hydraulic system the whole control device is axially shifted, the angle of incidence of the blade groups being collectively shifted.

16. People's helicopter with a blade group rotor, a variable unsymmetric rotor airfoil for the compensation of torque and a symmetry and a blade control, defined in that a horizontal driving engine and fuel tank are installed in the nose of the fuselage in front of the rotor shaft driving the vertical rotor shaft mounted on the middle carrier of the cabin, by means of a coupling and a miter-wheel gearing which is fixed to the bottom of the fuselage in a casing, the pilot being seated behind the rotor shaft, thus permitting to achieve an optimum aerodynamic form of the fuselage, at the tail in the rotor flow being adjustably mounted a slanting side rudder for turning helicopter in hovering flight, whereby the side rudder is operated together with a rear wheel control of a three-wheel landing gear, while at the rear part for the stabilization of helicopter during forward flight an elevator airfoil shaped like a rectangular triangle is fixed on each side of the middle part of the fuselage.

17. A people's helicopter as under claim 16 above defined in that the side rudder is fixed to a slanting control rod, the control rod being connected at the upper end with a shank, this being held in zero position by an arm which is squared off by a storage spring fixed to the fuselage tail, while the shank is fixed to the wheel control at its lower end, whereby the wheel control at the lower end, vertically rotating, holds the two-arm lever in the crossarm, at the rear part of the two-arm lever being adjustably mounted the rear wheel, while a tension spring is fixed to the other part, the motion of the rear wheel in vertical direction being damped, the crossarm being connected with a front crossarm at the side rudder pedal at each side by means of a towing line, whereby the side rudder and the rear wheel are jointly operated by the pilot.

* * * * *